(12) United States Patent
Yamazaki et al.

(10) Patent No.: US 10,908,368 B2
(45) Date of Patent: Feb. 2, 2021

(54) OPTICAL CABLE CONNECTION STRUCTURE AND OPTICAL CABLE CONNECTION METHOD

(71) Applicant: Hirose Electric Co., Ltd., Tokyo (JP)

(72) Inventors: Takeshi Yamazaki, Tokyo (JP); Kentaro Ishii, Tokyo (JP); Ryozo Koyama, Tokyo (JP); Hiroshi Tanooka, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/791,931

(22) Filed: Feb. 14, 2020

(65) Prior Publication Data

US 2020/0264388 A1 Aug. 20, 2020

(30) Foreign Application Priority Data

Feb. 14, 2019 (JP) .................................. 2019-024320

(51) Int. Cl.
  *G02B 6/36* (2006.01)
  *G02B 6/38* (2006.01)

(52) U.S. Cl.
  CPC .......... *G02B 6/3887* (2013.01); *G02B 6/3817* (2013.01); *G02B 6/3885* (2013.01)

(58) Field of Classification Search
  CPC ... G02B 6/3887; G02B 6/3817; G02B 6/3885
  See application file for complete search history.

(56) References Cited

U.S. PATENT DOCUMENTS

| | | | | |
|---|---|---|---|---|
| 7,113,679 B2* | 9/2006 | Melton | ................. | G02B 6/447 385/113 |
| 7,463,803 B2* | 12/2008 | Cody | ................. | G02B 6/4475 385/100 |
| 7,744,288 B2* | 6/2010 | Lu | ....................... | G02B 6/3894 385/60 |
| 8,646,989 B2* | 2/2014 | Zimmel | ................ | G02B 6/381 385/81 |
| 9,122,021 B2* | 9/2015 | Elenbaas | ............. | G02B 6/3831 |
| 9,395,500 B2* | 7/2016 | Zimmel | .............. | G02B 6/3889 |

(Continued)

FOREIGN PATENT DOCUMENTS

JP 5089635 B2 12/2012

*Primary Examiner* — Ellen E Kim (74) *Attorney, Agent, or Firm* — Procopio, Cory, Hargreaves & Savitch LLP (57) ABSTRACT

An optical cable, in which a fiber optic core and tensile strength filaments are covered with a covering, is connected to a connecting element incorporated into a connector, wherein a clamping member clamps the end portion of the covering along its outer peripheral surface in a state where the covering has been removed from the end portion of the optical cable such that the fiber optic core and the tensile strength filaments are uncovered; a gripping member that grips the exposed tensile strength filaments in a state where the exposed fiber optic core passes therethrough; and a protective member that covers a range extending from the clamping member to the gripping member in the axial direction of the fiber optic core in a state where the exposed fiber optic core is connected to a connecting element of the connector while the gripping member is attached to the connector.

6 Claims, 11 Drawing Sheets

(56) References Cited

U.S. PATENT DOCUMENTS

| | | | |
|---|---|---|---|
| 9,766,413 B2* | 9/2017 | Zimmel | G02B 6/3887 |
| 9,810,855 B2* | 11/2017 | Cox | G02B 6/3887 |
| 2014/0037250 A1* | 2/2014 | Treadwell | G02B 6/46 385/78 |
| 2018/0188463 A1* | 7/2018 | Szumacher | G02B 6/448 |

* cited by examiner

OPTICAL CABLE CONNECTION STRUCTURE AND OPTICAL CABLE CONNECTION METHOD

CROSS REFERENCE TO RELATED APPLICATIONS

This Paris Convention Patent Application claims benefit under 35 U.S.C. § 119 and claims priority to Japanese Patent Application No. JP 2019-024320, filed on Feb. 14, 2019, titled "OPTICAL CABLE CONNECTION STRUCTURE AND OPTICAL CABLE CONNECTION METHOD", the content of which is incorporated herein in its entirety by reference for all purposes.

BACKGROUND

Technical Field

The present invention relates to an optical cable connection structure and an optical cable connection method.

Related Art

A method, whereby an optical cable including a fiber optic core and tensile strength filaments covered with a covering is connected to a connector, has been disclosed, for instance, in Patent Document 1.

In this Patent Document 1, the end portion of the covering ("sheath" in Patent Document 1) is removed such that the fiber optic core (optical fiber) and the tensile strength filaments (tensile strength members) are not covered by the end portion of the sheath, and the exposed distal end of the fiber optic core is secured to a ferrule. The ferrule is accommodated within a plug frame and a securing member attached to the plug frame. A push spring is provided between the ferrule and the securing member, and the ferrule is biased forward (in a direction that will pull on the fiber optic core) by the push spring. Thus, when the ferrule is pushed rearwardly against the above-mentioned push spring, slackening occurs locally in the exposed fiber optic core.

A gripping member is externally fitted over the above-mentioned securing member and the exposed tensile strength filaments are pulled forwardly from the end portion of the sheath and threaded between the securing member and the gripping member, whereupon the tensile strength members are gripped in a rigid manner by crimping the gripping member. Thus, while tension is borne by the tensile strength filaments, the fiber optic core is loosely connected to the optical connector without being under tension. After that, the exposed tensile strength filaments and the fiber optic core are covered and protected by a protective member (boot) secured in the housing.

PATENT DOCUMENTS

Patent Document 1

Japanese Patent No. 5,089,635.

SUMMARY

Problems to be Solved

However, in Patent Document 1, despite the fact that the tensile strength filaments themselves are gripped by their end portions by the securing member and the gripping member, these tensile strength filaments are not securely gripped by the covering and could be pulled out of the covering if acted upon by a forwardly directed external force. Consequently, the length of the above-mentioned tensile strength filaments exposed in the end portion of the covering could increase if said tensile strength filaments were subjected to an external force before they are protected by the protective member. The exposed length is indeterminate and depends on the magnitude of the external force.

Therefore, when the exposed length of the tensile strength filaments becomes excessively long, the above-mentioned tensile strength filaments may end up not being fully accommodated within the protective member, thereby hindering the connection of the optical cable to the optical connector.

In view of these circumstances, it is an object of the present invention to provide an optical cable connection structure and an optical cable connection method, in which the exposed length of the tensile strength filaments is constant and the connection of the optical connector to the optical cable is accomplished smoothly.

Technical Solution

In accordance with the present invention, the above-described problem is eliminated with the help of an optical fiber connection structure and an optical fiber connection method configured as follows.

<Optical Fiber Connection Structure>

In the optical fiber connection structure according to the present invention, an optical cable wherein a fiber optic core and tensile strength filaments are covered with a covering is connected to a connecting element incorporated into a connector.

In the present invention, such an optical cable connection structure comprises: a clamping member that clamps the end portion of the covering along its outer peripheral surface in a state where the covering has been removed from the end portion of the optical cable such that the fiber optic core and the tensile strength filaments are not covered by the end portion of the covering; a gripping member that grips the exposed tensile strength filaments not covered by the end portion of the covering in a state where the exposed fiber optic core not covered by the end portion of the covering passes therethrough; and a protective member that covers a range extending from the clamping member to the gripping member in the axial direction of the fiber optic core in a state where the exposed fiber optic core is connected to a connecting element of the connector while the gripping member is attached to said connector.

In the present invention configured as described above, the exposed tensile strength filaments have the clamping member and the gripping member secured at two locations spaced apart by the exposed length, therefore the exposed tensile strength filaments are not pulled out from the covering even when subjected to an external force and the exposed length between the above-mentioned two locations remains constant.

In the present invention, the gripping member comprises an internal gripping member whose axis is the longitudinal direction of the fiber optic core and an external gripping member externally fitted over said internal gripping member, and said external gripping member may be adapted to be crimped such that it grips the exposed tensile strength filaments in a state where the exposed tensile strength filaments are threaded from within the internal gripping member between said internal gripping member and external gripping member. By doing so, the gripping member can easily grip the tensile strength filaments using a simple configuration.

In the present invention, the exposed fiber optic core and the exposed tensile strength filaments are preferably covered by the protective member through the medium of an intermediate sleeve while being threaded into said intermediate sleeve. The exposed tensile strength filaments and the exposed fiber optic core can thus be held together using the intermediate sleeve, thereby facilitating the operation of attaching the protective member.

In the present invention, the intermediate sleeve may be a tube of heat-shrinkable resin. If such an intermediate sleeve is used, the exposed fiber optic core and the exposed tensile strength filaments are confined to a smaller diameter by heat shrinking said intermediate sleeve after it has been externally fitted thereover.

In the present invention, the connecting element of the connector to which the fiber optic core is connected may be, for example, a converter circuit module that converts optical signals obtained from the optical fiber to electrical signals.
<Optical Fiber Connection Method>

The above-described optical fiber connection structure of the present invention is connected in accordance with an optical fiber connection method involving the following connection procedure.

An optical cable connection method for connecting an optical cable in which a fiber optic core and tensile strength filaments are covered with a covering to a connecting element incorporated into a connector, wherein the optical cable connection method comprises: a preparatory step, which involves both removing the covering from the end portion of the optical cable such that the fiber optic core and the tensile strength filaments are not covered by the end portion of the covering, and externally fitting over the optical fiber cable a protective member used to cover the exposed fiber optic core and the exposed tensile strength filaments not covered by the end portion of the covering and a gripping member used to grip said exposed tensile strength filaments; a gripping member advancement step, which involves bringing the gripping member to a location adjacent the end portion of the exposed tensile strength filaments by moving it forwardly with respect to the exposed fiber optic core and the exposed tensile strength filaments; a clamping step, which involves clamping the outer peripheral surface of the end portion of the covering with the clamping member; a gripping step, which involves gripping the end portion of the exposed tensile strength filaments with the gripping member; a fiber optic core connection step, which involves pulling out the exposed fiber optic core by pulling the gripping member back rearwardly while slackening the exposed tensile strength filaments, and connecting it to the connecting element; a gripping member attachment step, which involves moving the gripping member forwardly again and attaching it to the connector; and a protective member attachment step, which involves moving the protective member forwardly and covering a range extending from the clamping member to the gripping member in the longitudinal direction of the fiber optic core.

Technical Solution

Since in the present invention, as described above, the clamping member and the gripping member are secured to the exposed tensile strength filaments at two spaced-apart locations, even when subjected to an external force in the pullout direction, the exposed tensile strength filaments are not pulled out from the covering and the exposed length between the above-mentioned two locations remains constant. Therefore, the attachment of the protective member can be performed in an easy and reliable manner and the operation of connecting the optical cable to the connector can be accomplished simply and precisely.

BRIEF DESCRIPTION OF DRAWINGS

FIG. 5(A) and FIG. 5(B) are cross-sectional view of the clamping member and the gripping member, where FIG. 5(A) illustrates the condition before the clamping step and before the gripping step, and FIG. 5(B), which is a cross-section taken in a plane perpendicular to FIG. 5(A), illustrates the condition after the clamping step and after the gripping step.

DETAILED DESCRIPTION

Figure 1:
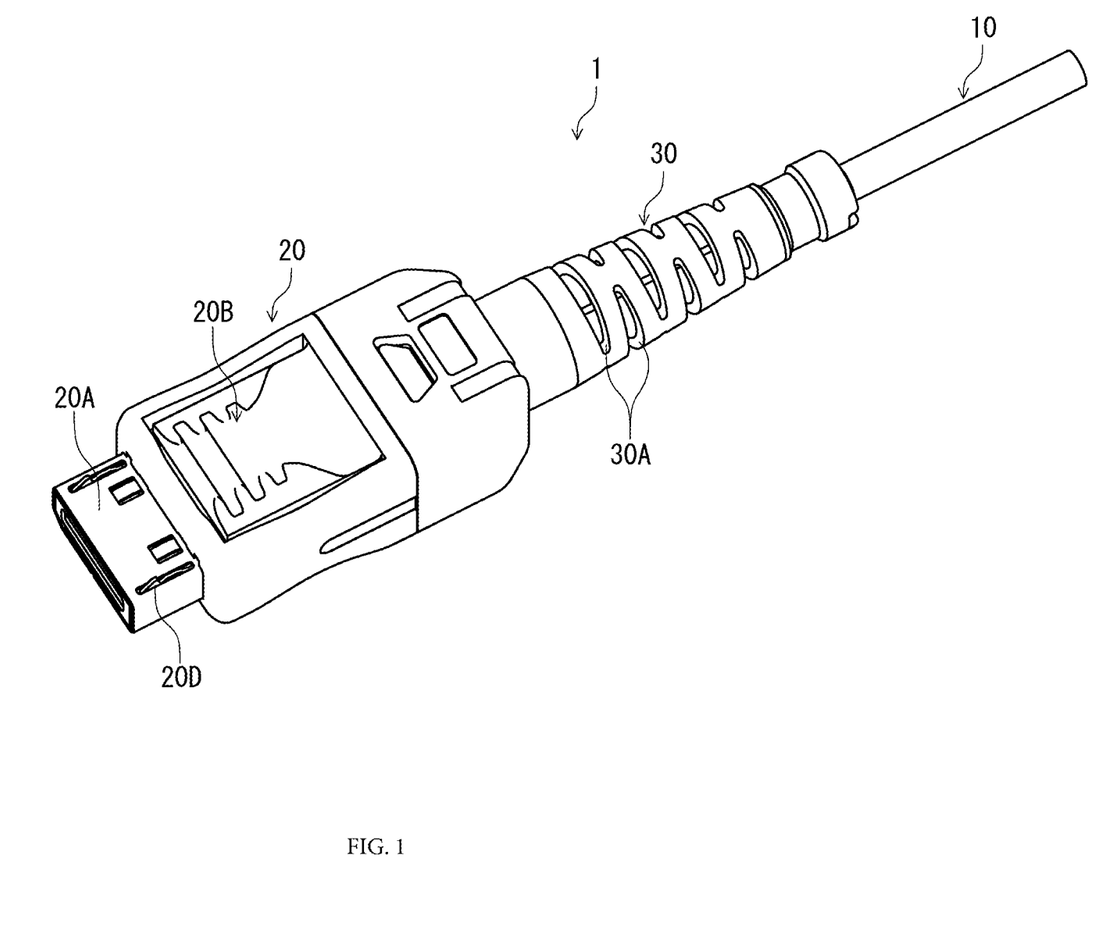
FIG. 1 is a perspective view illustrating the external appearance of an optical cable connection structure used as an embodiment of the present invention.
Figure 2:
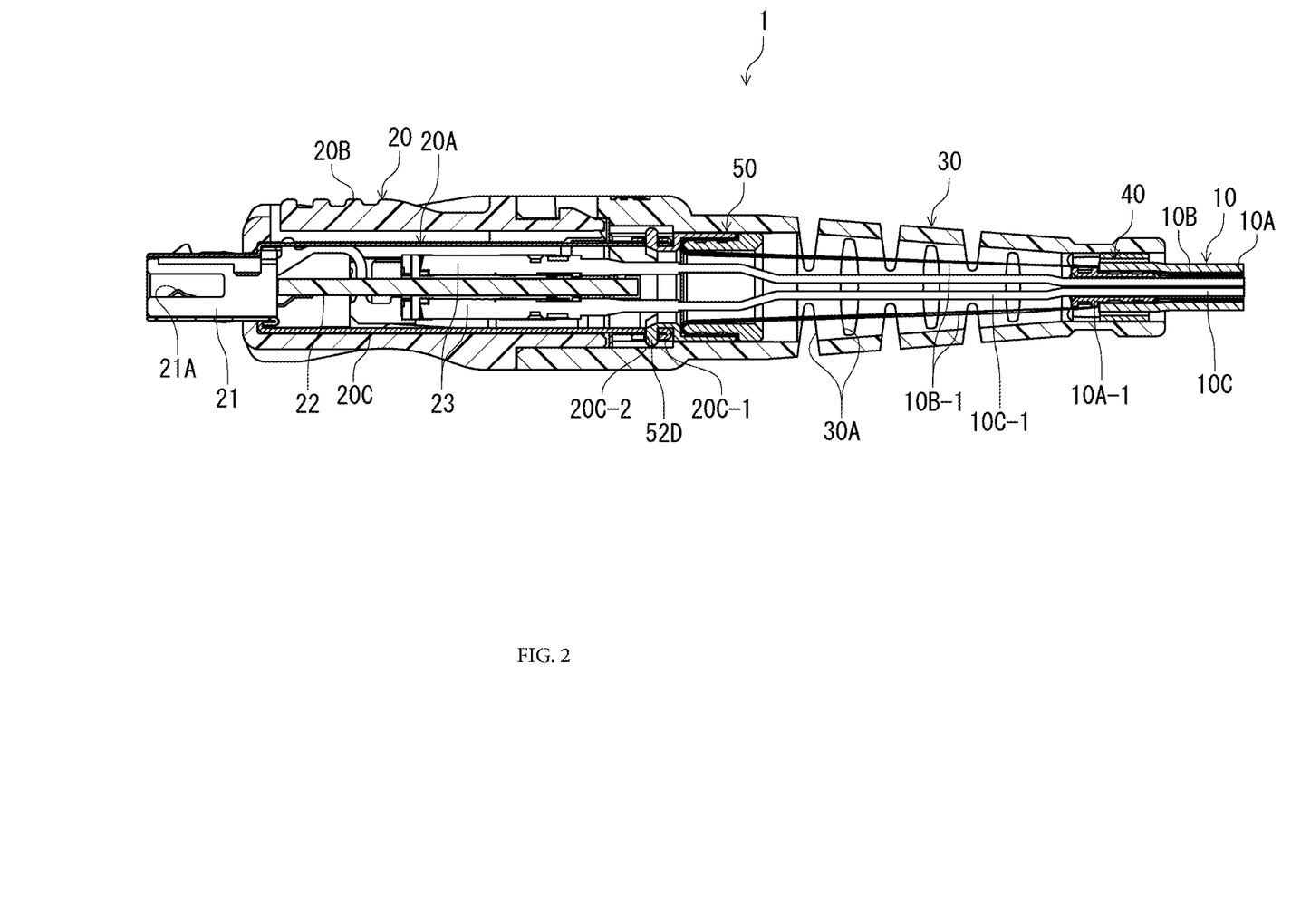
FIG. 2 is a cross-sectional view taken in a plane containing the axis of the optical cable connection structure of FIG. 1.

FIG. 1 is a perspective view illustrating the external appearance of an optical cable connection structure 1 used as an embodiment of the present invention, and FIG. 2 is a cross-section taken in a plane that contains its axis. In FIG. 1 and FIG. 2, the optical fiber connection structure 1 has an optical cable 10 connected to a connector 20, with the connection portion covered by a boot 30 serving as a protective member.

In the present embodiment, with regard to the orientation of the optical cable 10 in the axial direction, the orientation in which the connector 20 is located is referred to as the "front" or "forward", and the orientation in which the optical cable 10 is located is referred to as the "rear" or "rearward".

Figure 3:
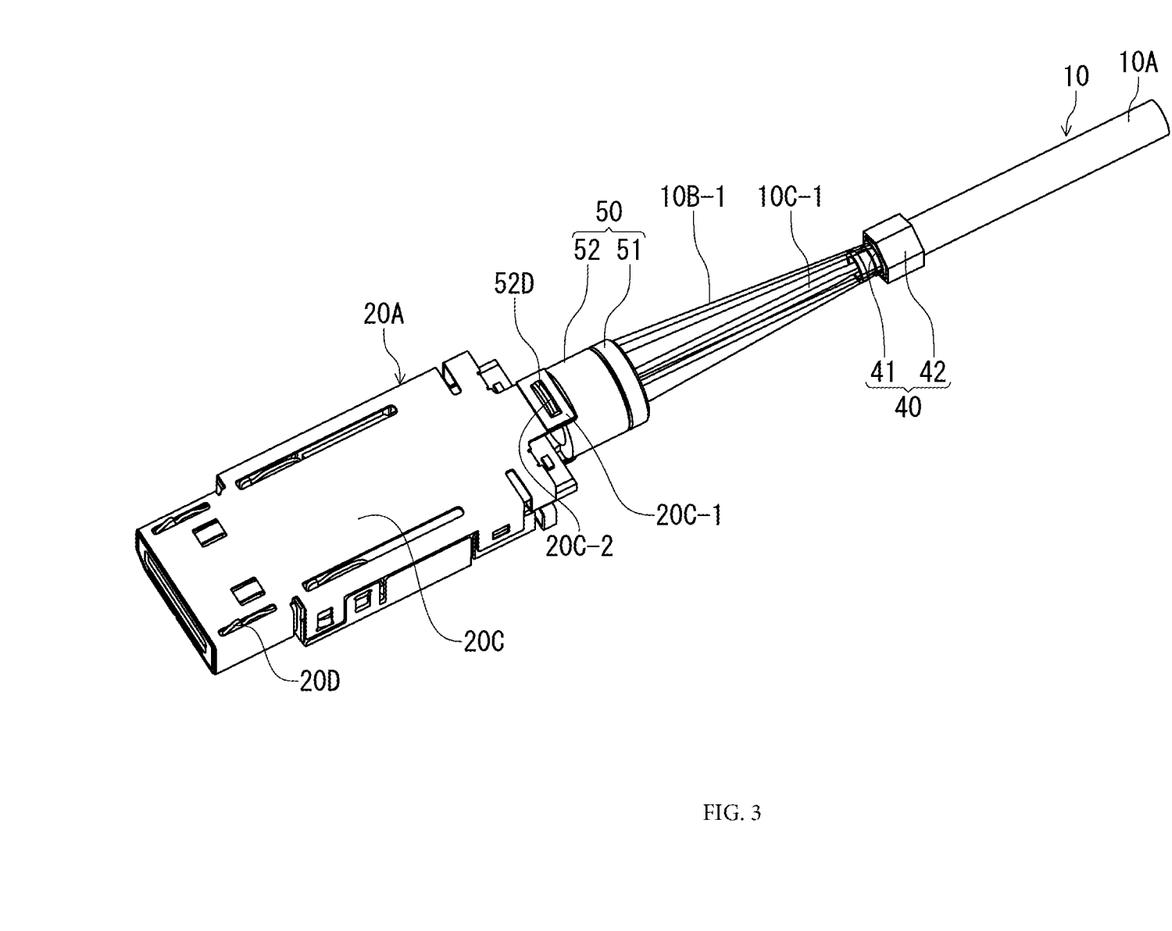
FIG. 3 is a perspective view illustrating the optical cable connection structure of FIG. 1, with the boot serving as a protective member and the cover of the connector detached.
Figure 4:
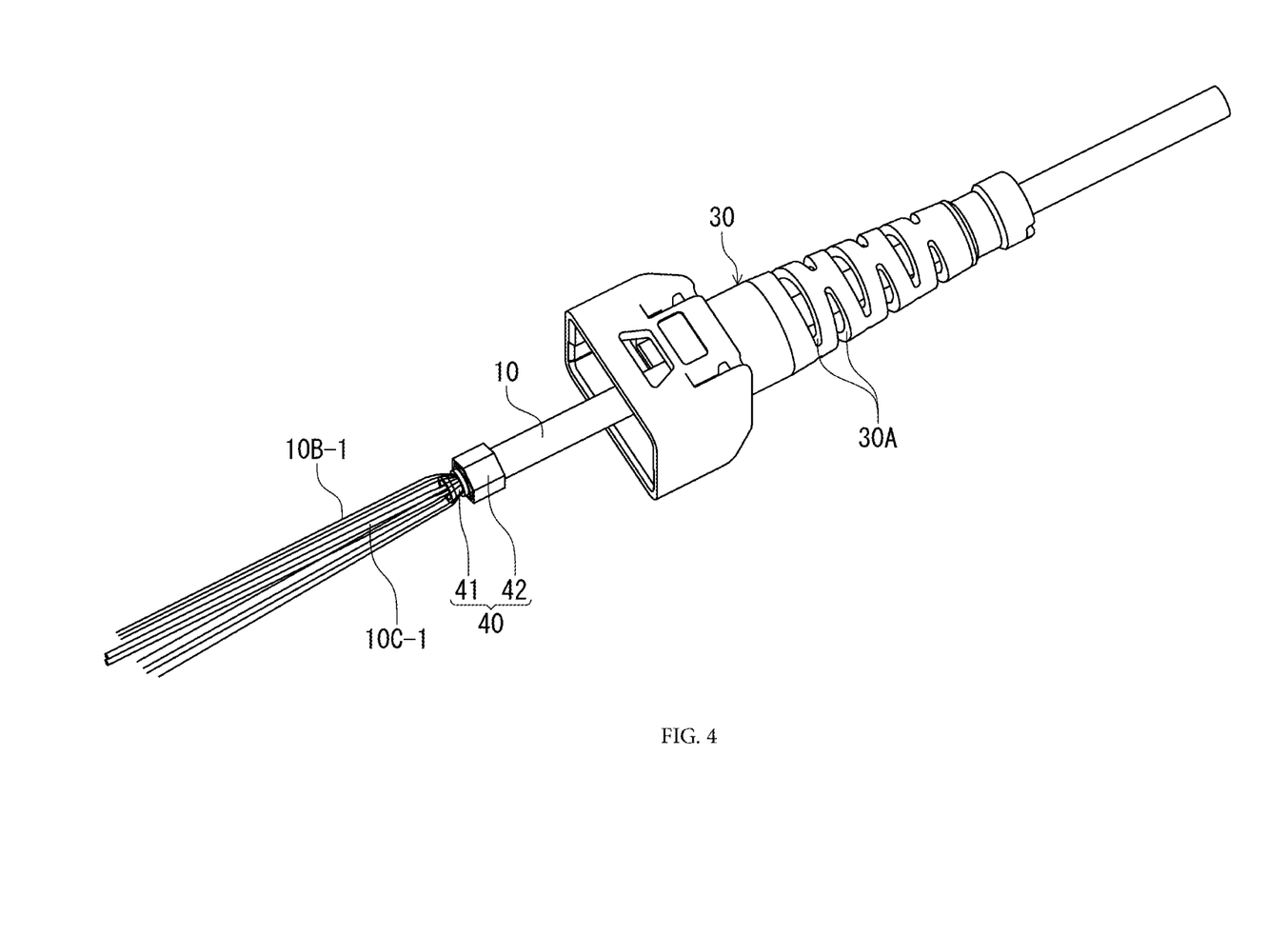
FIG. 4 is a perspective view illustrating the clamping member and its periphery during the clamping step.

As can be seen in FIG. 3, which illustrates a state with the boot 30 and the cover 20B of the connector 20 omitted, in the above-mentioned optical cable connection structure 1, the optical cable 10 is connected to the connector main body 20A. As can be seen in FIG. 2, said optical cable 10 has a fiber optic core 10C contained within a covering 10A and fibrous tensile strength filaments (e.g., "Kevlar" (registered trademark)) 10B distributed around said fiber optic core 10C. A portion of the covering is cut away throughout a predetermined length on the front end side of the cable (on the left in FIG. 2), with the tensile strength filaments 10B and fiber optic core 10C not covered by the end portion of the covering 10A-1 (the front end portion of the covering that remains rearward of the cutting location upon partial removal of the covering). The clamping member 40, which is used to clamp the outer peripheral surface of the above-mentioned end portion of the covering 10A-1 by crimping and the like, is attached to said end portion of the covering 10A-1, and said clamping member 40, with its clamping force, holds the end portion of the covering 10A-1 and the tensile strength filaments 10B as well as the fiber optic core 10C to impede displacement (relative movement) therebetween in the axial direction of the optical cable 10. Further, the front end portion of the exposed tensile strength filaments 10B-1 exposed forwardly of the above-mentioned end portion of the covering 10A-1 clamped by the clamping member 40 is gripped by the gripping member 50, and said gripping member 50 is attached to the connector main body 20A. The optical fiber 10C is not covered by the end portion of the covering 10A-1 forwardly of the above-mentioned clamping member 40 to form the exposed fiber optic core 10C-1.

Figure 7:
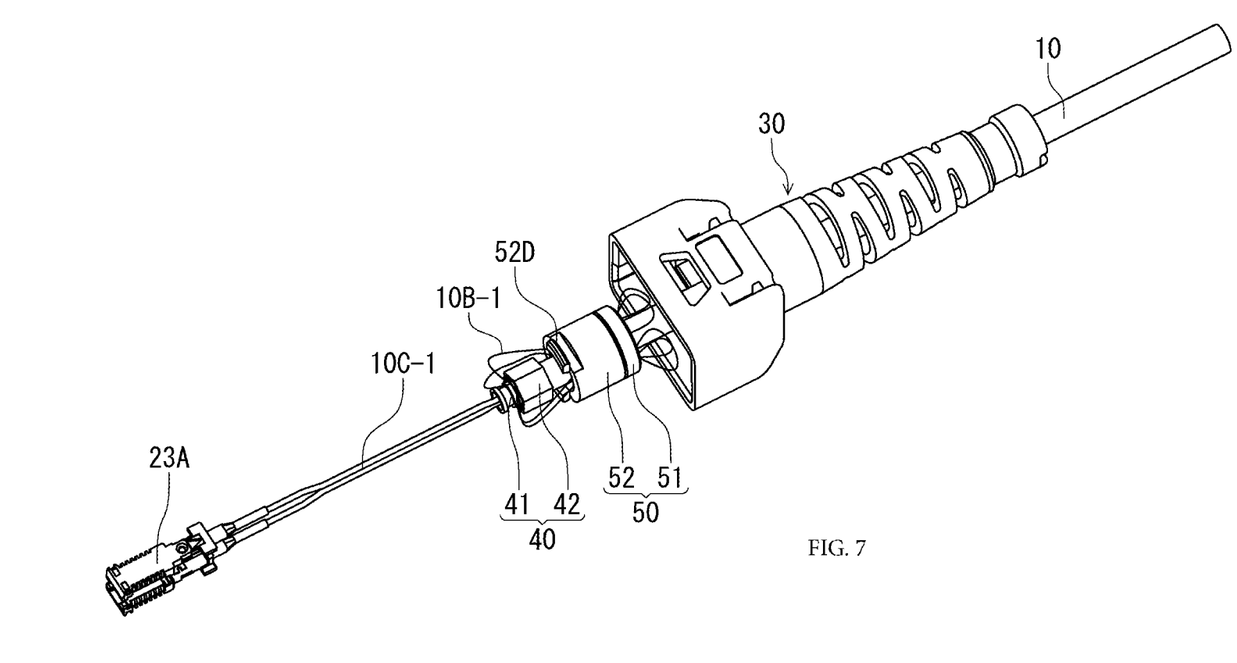
FIG. 7 is a perspective view illustrating the connecting element of the connector, the clamping member, and the gripping member after the fiber optic core connection step.

The exposed fiber optic core 10C-1 of the optical cable 10 extends forwardly of the gripping member 50 without being restrained by the gripping member 50 gripping the exposed tensile strength filaments 10B-1 and is connected to a first connecting element 23A provided in the connector main body 20A (not shown in FIGS. 1, 2; see FIG. 7).

Next, the configuration and attachment procedure of the clamping member 40 and the gripping member 50 will be described with reference to FIG. 2, FIG. 3, FIG. 5(A) and FIG. 5(B). Here, FIG. 5(A) and FIG. 5(B) are cross-sectional view of the clamping member 40 and the gripping member 50 in a plane containing the axis of the optical cable 10, where FIG. 5 (A) illustrates the state before clamping by the clamping member 40 and before gripping by the gripping member 50, and FIG. 5 (B) is a cross-sectional view illustrating the state after clamping by the clamping member 40 and after gripping by the gripping member 50 in a plane perpendicular to FIG. 5 (A) (i.e., a plane rotated 90° about the axis of the optical cable 10).

Figure 5A:
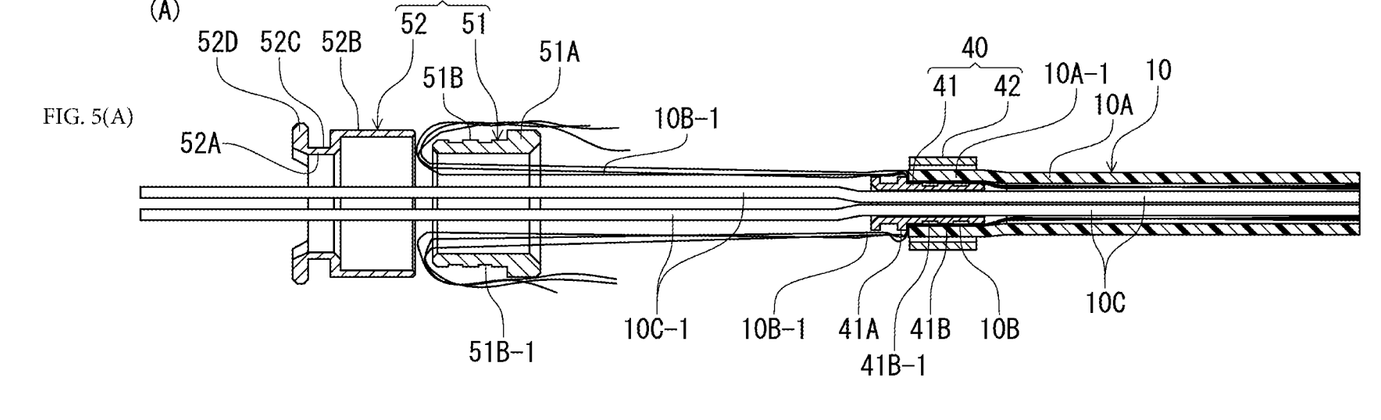

As can be seen in FIG. 3 and FIG. 5 (A), the clamping member 40 has a metal tubular inner guide member 41 and a metal tubular outer clamping member 42 externally fitted over said inner guide member 41. The inner guide member 41 has an outer diameter and an inner diameter allowing insertion between the end portion of the covering 10A-1 of the optical cable 10 and the fiber optic core 10C, and the outer clamping member 42 has an inner diameter allowing for its inner peripheral surface to form a gap with the outer peripheral surface of the end portion of the covering 10A-1 of the optical cable 10. In the inner guide member 41, an annular outer peripheral protrusion 41A, which abuts the end surface of said end portion of the covering 10A-1 in the axial direction, is provided on the outer peripheral surface of said inner guide member 41 outside said end portion of the covering 10A-1 in order to define its axial position with respect to the end portion of the covering 10A-1. In addition, multiple shallow annular engagement grooves 41B-1 are formed on the outer peripheral surface of a cylindrical portion 41B located within the end portion of the covering 10A-1 to thereby facilitate engagement of the inner peripheral surface of the end portion of the covering 10A-1.

Further, the outer clamping member 42 has a polygonal outer peripheral surface suitable for compression (crimping) operations intended to radially compress the end portion of the covering 10A-1 (see FIG. 3).

Figure 5B:
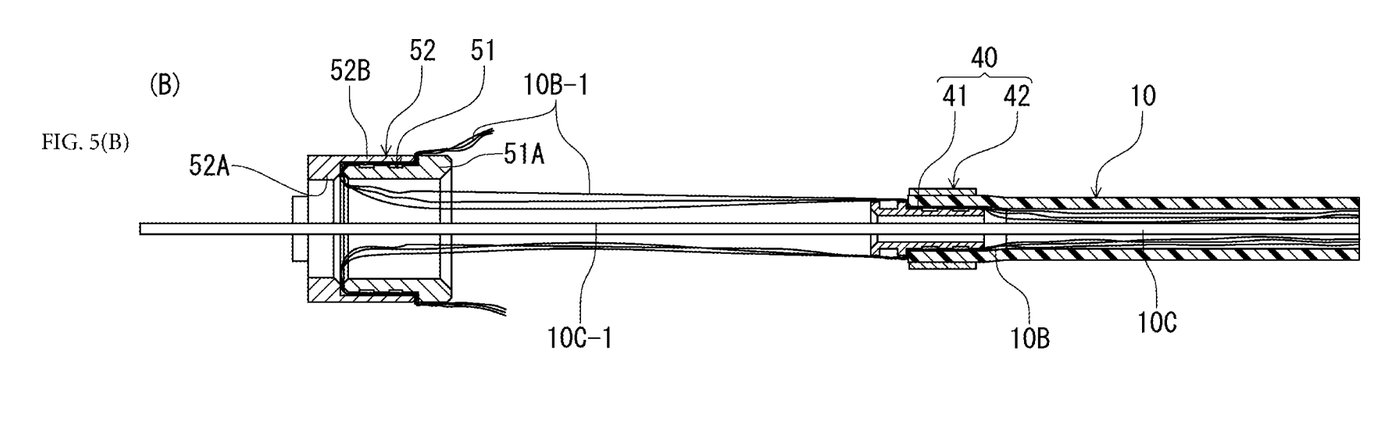

As can be seen in FIG. 3, FIG. 5(A) and FIG. 5(B), the gripping member 50 has a metal tubular internal gripping member 51 and a metal tubular external gripping member 52, which is externally fitted over said internal gripping member 51 while providing a gap therebetween, and the exposed tensile strength filaments 10B-1 are threaded into the above-mentioned gap while being distributed in the circumferential direction. As can be seen in FIG. 5 (B), in the internal gripping member 51, an annular outer peripheral protrusion 51A, which abuts the end surface of the external gripping member 52 in the axial direction, is provided at the end portion of the outer peripheral surface of said internal gripping member 51 outside said external gripping member 52 in order to define its axial position with respect to said external gripping member 52. In addition, multiple shallow annular engagement grooves 51B-1 (see FIG. 5 (A)) are formed on the outer peripheral surface of a cylindrical portion 51B located within the external gripping member 52 to thereby facilitate engagement of the exposed tensile strength filaments 10B-1.

The external gripping member 52 is provided with a cylindrical portion 52B, which is externally fitted over the outer peripheral surface of the cylindrical portion 51B while providing a gap with said cylindrical portion 51B of the above-mentioned internal gripping member 51, and an annular inner peripheral protrusion 52A, which protrudes inwardly from said cylindrical portion 52B in the radial direction at the axial end portion of said cylindrical portion 52B, and, when the above-mentioned cylindrical portion 52B is externally fitted over the cylindrical portion 51B of said internal gripping member 51 until it abuts the annular outer peripheral protrusion 51A of the above-mentioned internal gripping member 51 in the axial direction, the above-mentioned annular inner peripheral protrusion 52A abuts the axial end portion of the cylindrical portion 51B of the above-mentioned internal gripping member 51. Thus, a gap, which appears crank-shaped when viewed in cross section as shown in FIG. 5 (B), is formed between the internal gripping member 51 and the external gripping member 52, thereby making it possible to thread the tensile strength filaments 10B into this gap as described hereinafter.

As can be seen in FIG. 3 and FIG. 5 (A), at a location near the axial end portion, the external gripping member 52 has radially indented grooves 52C formed at two locations opposed in a direction oriented along a single diametrical line, and engagement protrusions 52D, which protrude outwardly in the radial direction, are provided in the end portion. As shown in FIG. 5 (B), neither indented grooves nor engagement protrusions are provided in the direction perpendicular to the above-mentioned diameter line.

As can be seen in FIG. 1 and FIG. 2, the boot 30, which serves as a protective member, is made of an electrically insulating material and protects the exposed tensile strength filaments 10B-1 and the exposed fiber optic core 10C-1 that extend from the clamping member 40 to the rear portion of the connector 20, and, although it is shaped in the form of a thick sleeve, it has recesses 30A formed therein in the radial direction in an alternating manner at multiple locations along the axis at right angles to each other when viewed in the axial direction in order to provide overall flexibility.

As can be seen in FIG. 2, the connector main body 20A of the connector 20, to which the exposed fiber optic core 10C-1 of the above-mentioned optical cable 10 is connected (wired) and to which the gripping member 50 is attached, has a substrate portion 22 that extends rearwardly from a snap-fit connector portion 21 intended for mating with a counterpart connector (not shown) towards the optical cable 10, and a connecting element 23, which converts optical signals obtained from the optical cable 10 to electrical signals and transmits them to the terminal contact portions 21A of the above-mentioned snap-fit connector portion 21, is attached to each of the two surfaces of said substrate portion 22. Since in the present invention the connecting element 23 is not the subject matter of the present invention, a detailed description thereof has been omitted.

The connector main body 20A is covered with a case-shaped shielding member 20C. Said shielding member 20C has engagement tabs 20C-1 that protrude rearwardly from the rear end (i.e., the right end in FIG. 2 and FIG. 3) and form fold-back portions, with elongated groove-shaped engagement windows 20C-2 formed in said engagement tabs 20C-1. The engagement protrusions 52D of the above-mentioned external gripping member 52 are adapted to project inwardly into said engagement windows 20C-2 in the radial direction of the optical cable 10 and engage with the above-mentioned shielding member 20C in the axial direction. It should be noted that the above-mentioned connector main body 20A also has locking members 20D that prevent detachment during mating with the counterpart connector.

This connector main body 20A is protected by a cover 20B made of an electrically insulating material.

The connection of the optical cable 10 to the connector 20 and the procedure of connection/attachment of the boot 30, the clamping member 40, and the gripping member 50 to the optical cable 10 will be described below.

First, a predetermined length of the covering 10A is removed in the axial direction at the front end of the optical cable 10, making the tensile strength filaments 10B and the fiber optic core 10C not covered by the end portion of the covering 10A-1, and thereby forming a predetermined length of exposed tensile strength filaments 10B-1 and exposed fiber optic core 10C-1. Prior to or after removal of the predetermined length of the above-mentioned covering 10A, the above-mentioned boot 30, the outer clamping member 42 of the clamping member 40, and the gripping member 50, as well as the various members of the cover 20B of the connector 20 are externally fitted over the optical cable 10 in advance, thereby keeping all of said members on the rear side of the optical cable 10 in preparation for following steps (preparatory step).

Next, upon separation from the exposed tensile strength filaments 10B-1, after drawing out only the exposed fiber optic core 10C-1 forward, the multiple fibrous exposed tensile strength filaments 10B-1 are distributed in a circumferential direction while being threaded between the inner guide member 41 and the outer clamping member 42 of the clamping member 40 from the rear and, as shown in FIG. 5 (A), the above-mentioned inner guide member 41 is anteriorly brought to a position where the end portion of the covering 10 abuts the annular outer peripheral protrusion 41A of the inner guide member 41 of said clamping member 40 so as to sandwich the exposed tensile strength filaments 10B-1 in the axial direction with its front end. In addition, the outer clamping member 42 is positioned on top of the outer peripheral surface of the cylindrical portion 41B (the section located rearwardly of (i.e., to the right of) the annular outer peripheral protrusion 41A) of this inner guide member 41. At such time, the exposed fiber optic core 10C-1 extends forwardly by passing through the inner guide member 41, and the exposed tensile strength filaments 10B-1 extend forwardly between the above-mentioned inner guide member 41 and the outer clamping member 42.

Figure 6:
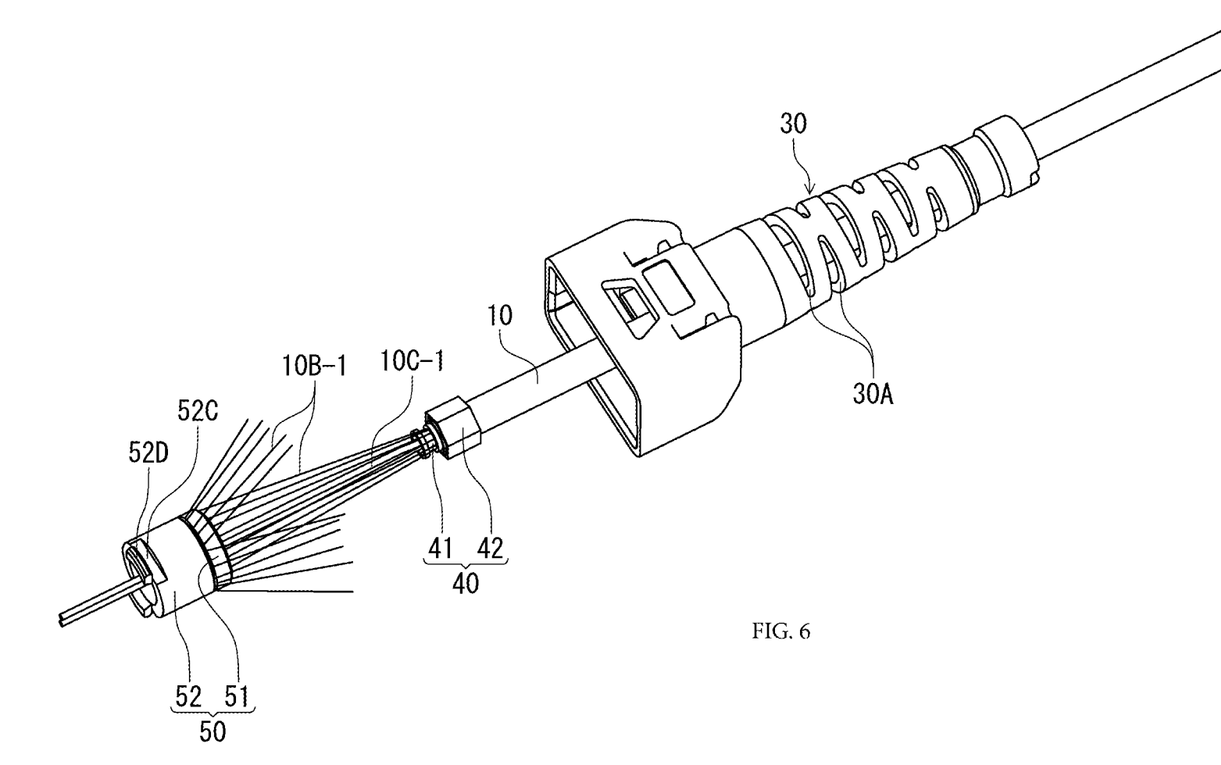
FIG. 6 is a perspective view illustrating the clamping member and the gripping member after the clamping step and after the gripping step.

Further, the gripping member 50 is brought to a position forward of the clamping member 40 (gripping member advancement step) (see FIG. 5 (A)), the exposed fiber optic core 10C-1 extending forwardly of the position of the clamping member 40 is passed through the internal gripping member 51 and the external gripping member 52 of the gripping member 50 and extends farther forward. On the other hand, the exposed tensile strength filaments 10B-1 extending forwardly from the clamping member 40 by a predetermined length are bent radially outward at the front end of the internal gripping member 51 of the gripping member 50 and are oriented rearwardly above the outer peripheral surface of said internal gripping member 51 (see FIG. 5 (A)). After that, the outer clamping member 42 is compressed (crimped) in the radial direction using an appropriate tool as shown in FIG. 5 (B), thereby gripping the exposed tensile strength filaments 10B-1 between the outer clamping member 42 and the inner guide member 41 (clamping step). Subsequently, the external gripping member 52 of the gripping member 50 is moved rearwardly with respect to the internal gripping member 51 and brought to a position where it abuts the annular outer peripheral protrusion 51A of the internal gripping member 51 such that the rear end of the cylindrical portion 52B of the external gripping member 52 sandwiches the exposed tensile strength filaments 10B-1. After that, as can be seen in FIG. 5 (B), the cylindrical portion 52B of the external gripping member 52 is compressed (crimped) radially inward using an appropriate tool and the exposed tensile strength filaments 10B-1 are gripped between the external gripping member 52 and the internal gripping member 51 (gripping step). In this state, the exposed fiber optic core 10C-1 extends forwardly from the gripping member 50 (see FIG. 6). As shown in FIG. 6, the exposed tensile strength filaments 10B-1 that protrude forwardly from between the external gripping member 52 and the internal gripping member 51 are cut away.

Figure 8:
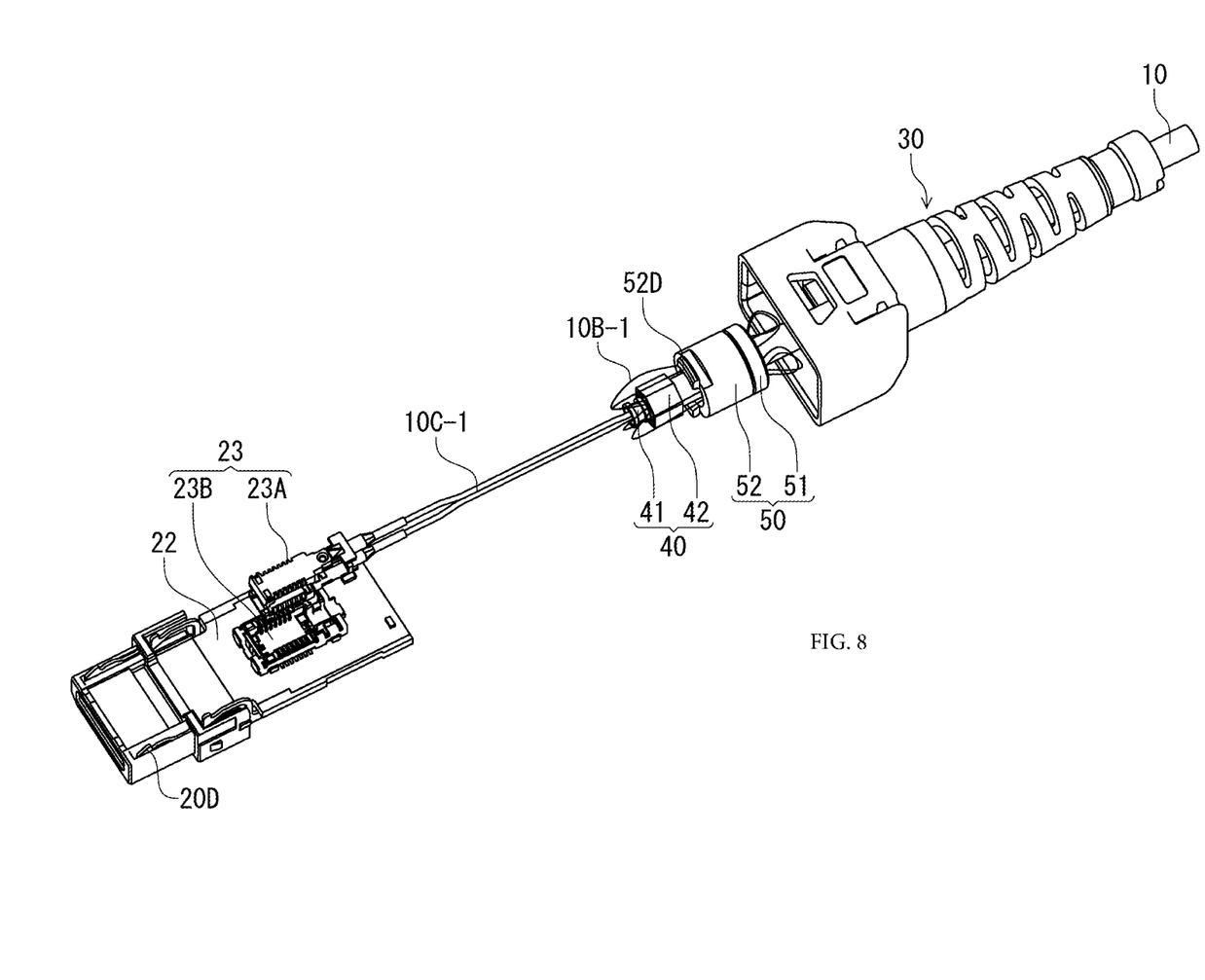
FIG. 8 is a perspective view illustrating, in addition to all the members shown in FIG. 7, a shielding member and the connector main body with its cover detached.

Subsequently, once the gripping member 50 that grips the exposed tensile strength filaments 10B is pulled rearwardly past the position of the clamping member 40, after making sure that the exposed tensile strength filaments 10B-1 will not be in the way when the exposed fiber optic core 10C-1 is connected to the connector main body 20A, as can be seen in FIG. 7, the front end of the exposed fiber optic core 10C-1 is connected to the first connecting element 23A of the connector main body 20A, to which the shielding member 20C is not yet attached (fiber optic core connection step). Thus, the above-mentioned first connecting element 23A, to which the above-mentioned exposed fiber optic core 10C-1 is connected, after having been brought to a state where it can be mated with the second connecting element 23B mounted to the substrate portion 22 of the connector 20 (see FIG. 8), is mated with the second connecting element 23B (see FIG. 9). The first connecting element 23A and second connecting element 23B together form the connecting element 23 of the connector main body 20A. Said connecting element 23 may also be formed as a single element without having to be split into the first connecting element 23A and the second connecting element 23B.

Figure 9:
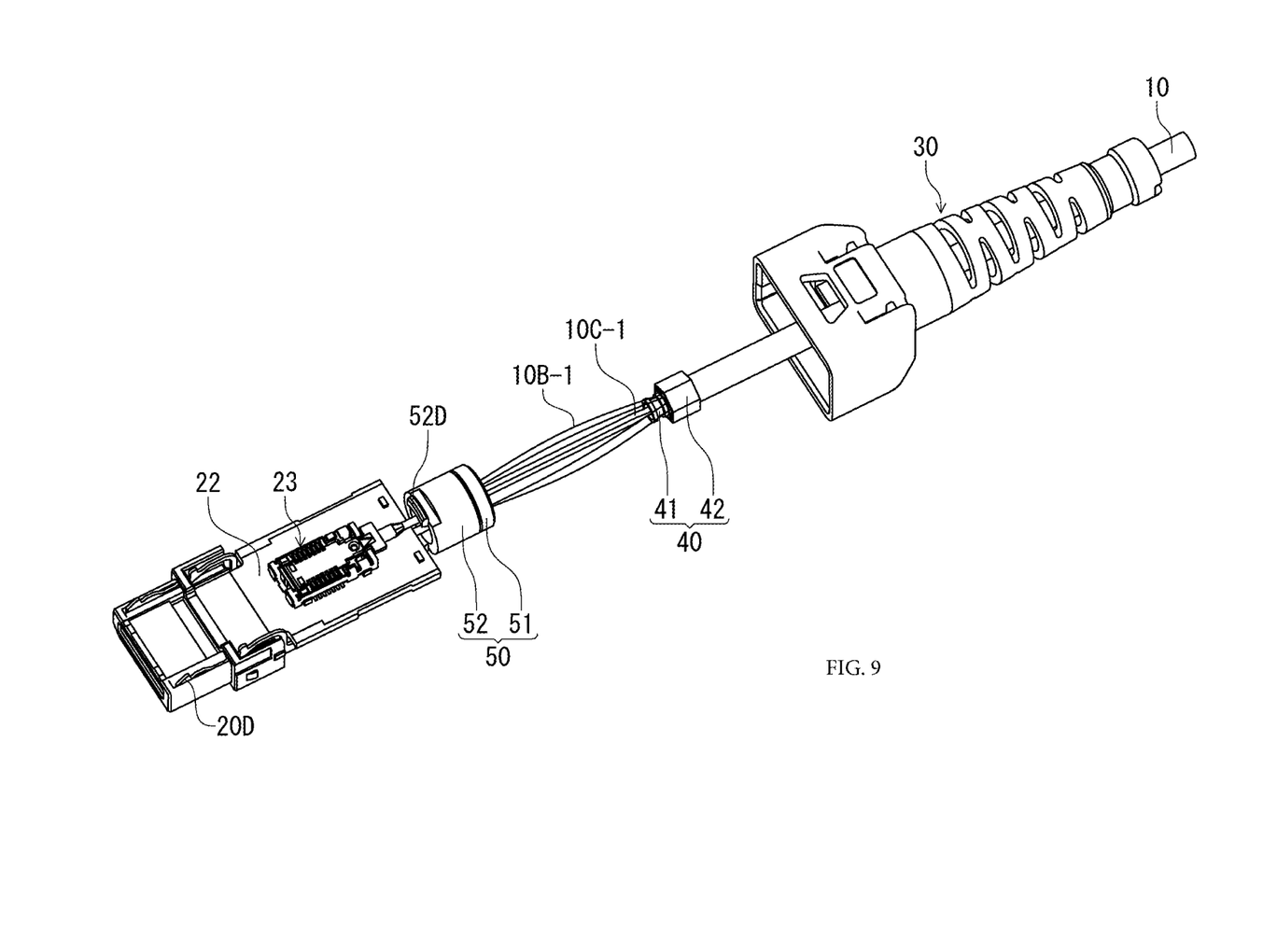
FIG. 9 is a perspective view obtained when the gripping member is pulled forwardly to return to the vicinity of the connector main body in FIG. 8.
Figure 10:
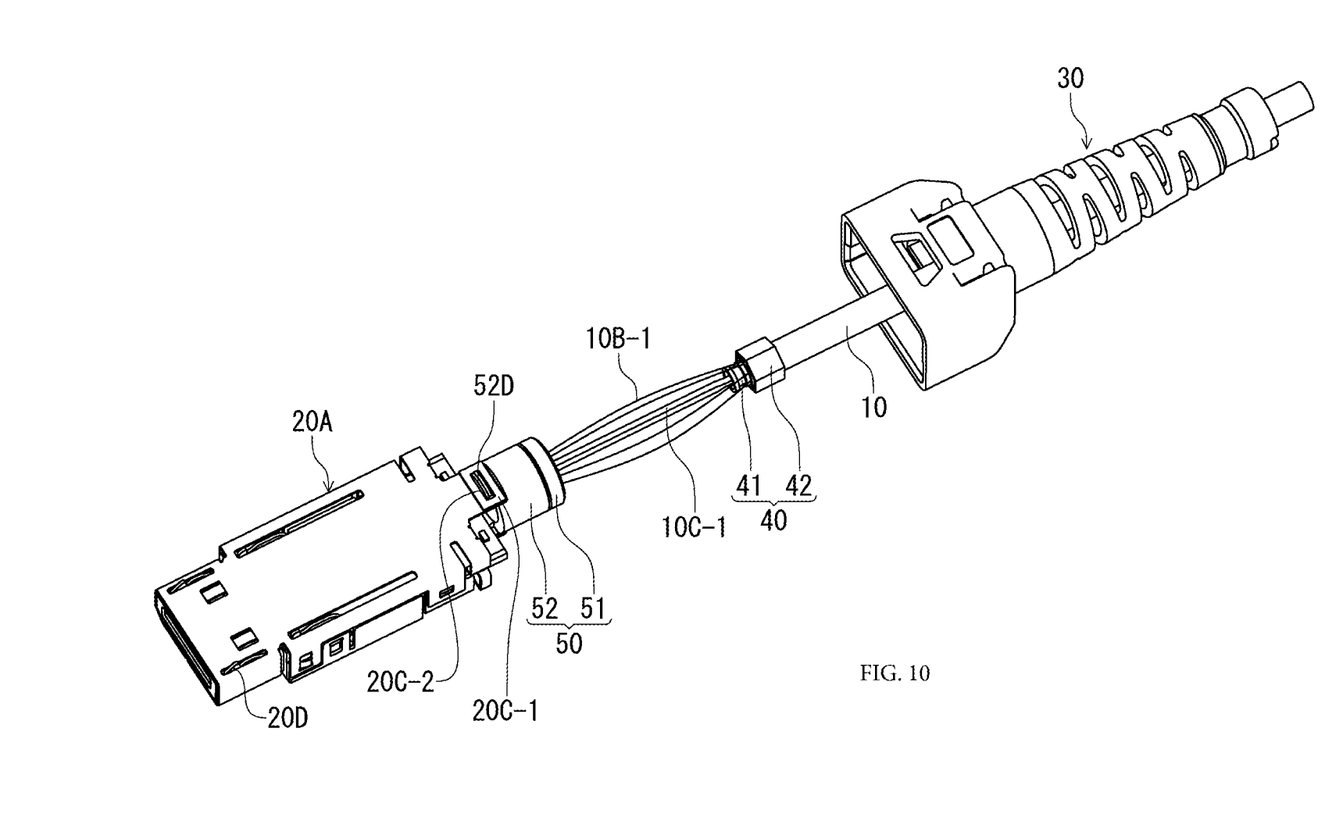
FIG. 10 is a perspective view illustrating the connector main body of FIG. 9 after attaching the shielding member in the gripping member attachment step when the gripping member is attached to the shielding member.

After that, the gripping member 50 is moved forward again to bring it near the rear end of the substrate portion 22 of the connector main body 20A as shown in FIG. 9 and the shielding member 20C of the connector main body 20A is attached as shown in FIG. 10, thereby obtaining a state in which the connector has no boot 30. Next, the gripping member 50 is moved forward, thereby producing an engaged state by inserting the engagement protrusions 52D provided the external gripping member 52 of the gripping member 50 into the engagement windows 20C-2 formed in the engagement tabs 20C-1 of the above-mentioned shielding member 20C, after which the attachment of the gripping member 50 to the connector main body 20A is complete (gripping member attachment step).

Figure 11:
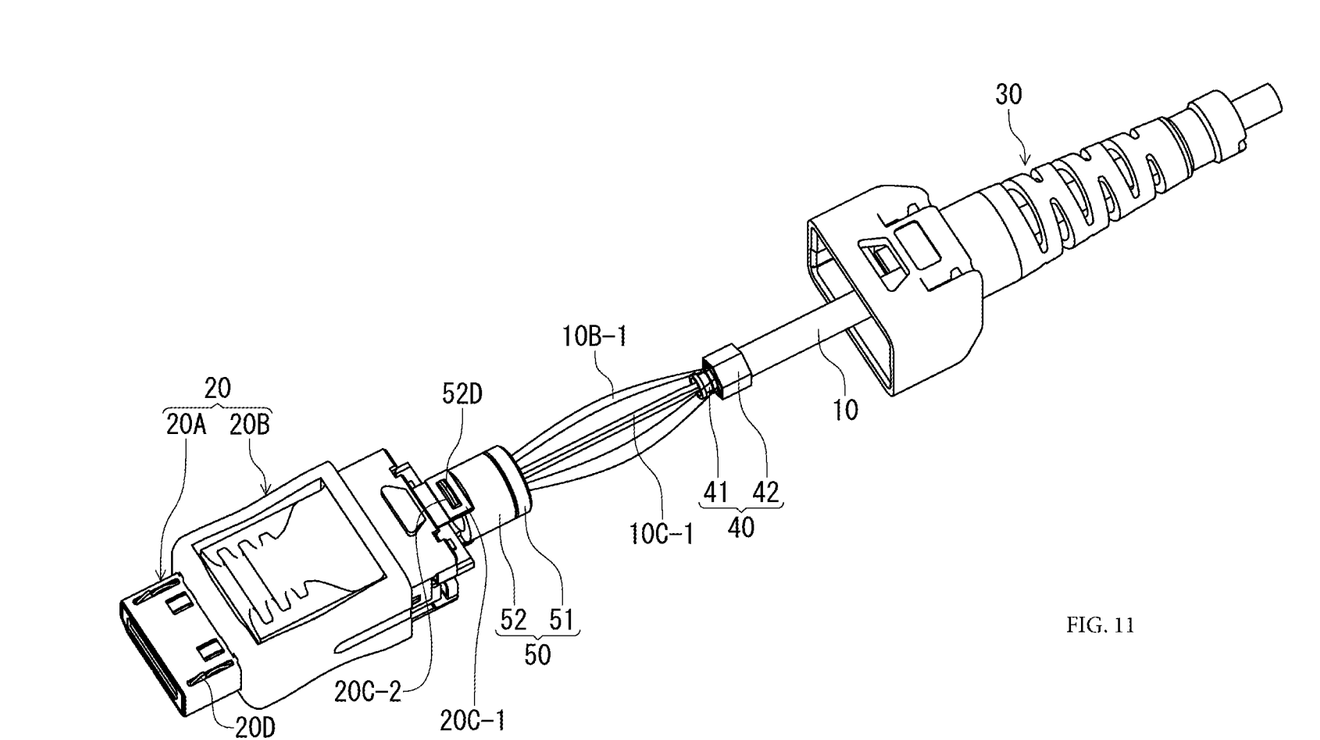
FIG. 11 is a perspective view obtained when the cover is attached to the connector main body of FIG. 10.

Subsequently, the cover 20B is attached to the connector main body 20A (see FIG. 11) and, if necessary, a shrink tube (not shown), as an intermediate sleeve, is fitted to the exposed fiber optic core 10C-1 and the exposed tensile strength filaments 10B-1 between the clamping member 40 and the gripping member 50 and shrunk by heating, thereby collectively protecting the exposed tensile strength filaments 10B-1 and the exposed fiber optic core 10C-1 and, next, the boot 30, which serves as a protective member, is moved forward and attached to the connector 20 as shown in FIGS. 1 and 2 to protect the range extending from the connector 20 to the clamping member 40 (protective member attachment step).

In this manner, in the present invention, the exposed tensile strength filaments 10B-1 not covered by the end portion of the covering 10A-1 are held by the clamping member 40 and the gripping member 50 at two locations spaced apart in the axial direction. Accordingly, even when said exposed tensile strength filaments 10B-1 are subjected to a force in the axial direction, they are not pulled out of the covering 10A, and the length of the exposed tensile strength filaments 10B-1 remains constant at all times. Therefore, the attachment of the boot 30 can be performed easily and reliably, and the operation of connecting the optical cable 10 to the connector 20 can be accomplished in a simple and precise manner. Further, since the exposed tensile strength filaments 10B-1 are not pulled out of the covering 10A to an excessive degree, the boot 30 that holds said exposed tensile strength filaments 10B-1 can be designed such that its size in the axial direction is kept to a minimum.

DESCRIPTION OF THE REFERENCE NUMERALS

1 Optical cable connection structure
10 Optical cable
10A Covering
10A-1 End portion of the covering
10B Tensile strength filaments
10B-1 Exposed tensile strength filaments
10C Fiber optic core
10C-1 Exposed fiber optic core
20 Connector
23 Connecting element
30 Boot (protective member)
40 Clamping member
50 Gripping member
51 Internal gripping member
52 External gripping member

The invention claimed is:

1. An optical cable connection structure in which an optical cable including a fiber optic core and tensile strength filaments covered with a covering is connected to a connecting element incorporated into a connector, wherein said structure comprises:
   a clamping member that clamps the end portion of said covering along its outer peripheral surface in a state where the covering has been removed from the end portion of the optical cable such that the fiber optic core and the tensile strength filaments are not covered by the end portion of the covering;
   a gripping member that grips the exposed tensile strength filaments not covered by the end portion of the covering in a state where the exposed fiber optic core not covered by the end portion of the covering passes therethrough; and
   a protective member that covers a range extending from the clamping member to the gripping member in the axial direction of the fiber optic core in a state where the exposed fiber optic core is connected to a connecting element of the connector while the gripping member is attached to said connector.

2. The optical cable connection structure according to claim 1, wherein the gripping member comprises an internal gripping member whose axis is the longitudinal direction of the fiber optic core and an external gripping member externally fitted over said internal gripping member, and said external gripping member is adapted to be crimped such that it grips the exposed tensile strength filaments in a state where the exposed tensile strength filaments are threaded from within the internal gripping member between said internal gripping member and external gripping member.

3. The optical cable connection structure according to claim 1, wherein the exposed fiber optic core and the exposed tensile strength filaments are covered by the protective member through the medium of an intermediate sleeve while being threaded into said intermediate sleeve.

4. The optical cable connection structure according to claim 3, wherein the intermediate sleeve is a tube of heat-shrinkable resin.

5. The optical cable connection structure according to claim 1, wherein the connecting element of the connector is a converter circuit module that converts optical signals obtained from the optical fiber to electrical signals.

6. An optical cable connection method for connecting an optical cable in which a fiber optic core and tensile strength filaments are covered with a covering to a connecting element incorporated into a connector, wherein the optical cable connection method comprises:
   a preparatory step, which involves both removing the covering from the end portion of the optical cable such that the fiber optic core and the tensile strength filaments are not covered by the end portion of the covering and externally fitting over the optical fiber cable a protective member used to cover the exposed fiber optic core and the exposed tensile strength filaments not covered by the end portion of the covering and a gripping member used to grip said exposed tensile strength filaments;
   a gripping member advancement step, which involves bringing the gripping member to a location adjacent the end portion of the exposed tensile strength filaments by moving it forwardly with respect to the exposed fiber optic core and the exposed tensile strength filaments;
   a clamping step, which involves clamping the outer peripheral surface of the end portion of the covering with the clamping member;
   a gripping step, which involves gripping the end portion of the exposed tensile strength filaments with the gripping member;
   a fiber optic core connection step, which involves pulling out the exposed fiber optic core by pulling the gripping member back rearwardly while slackening the exposed tensile strength filaments, and connecting it to the connecting element;

a gripping member attachment step, which involves moving the gripping member forwardly again and attaching it to the connector; and a protective member attachment step, which involves moving the protective member forwardly and covering a range extending from the clamping member to the gripping member in the longitudinal direction of the fiber optic core.

\* \* \* \* \*